(12) United States Patent
Williams et al.

(10) Patent No.: US 6,614,949 B2
(45) Date of Patent: Sep. 2, 2003

(54) PRECISION GRID STANDOFF FOR OPTICAL COMPONENTS ON OPTO-ELECTRONIC DEVICES

(75) Inventors: Richard J. Williams, Hollis, NH (US); Gregory K. Duddoff, Amherst, NH (US); Ronald J. Olson, Jr., Amherst, NH (US)

(73) Assignee: Teraconnect, Inc., Nashua, NH (US)

( * ) Notice: Subject to any disclaimer, the term of this patent is extended or adjusted under 35 U.S.C. 154(b) by 80 days.

(21) Appl. No.: 09/840,609

(22) Filed: Apr. 23, 2001

(65) Prior Publication Data

US 2002/0025099 A1 Feb. 28, 2002

(Under 37 CFR 1.47)

Related U.S. Application Data
(60) Provisional application No. 60/199,099, filed on Apr. 21, 2001.

(51) Int. Cl.[7] ................................. G02B 6/12
(52) U.S. Cl. .......................... 385/14; 385/88
(58) Field of Search .................. 385/14, 88, 89, 385/91, 129, 130, 131

(56) References Cited

U.S. PATENT DOCUMENTS

| | | | | |
|---|---|---|---|---|
| 5,257,336 A | * | 10/1993 | Dautartas | 385/93 |
| 5,266,794 A | * | 11/1993 | Olbright et al. | 250/214 LS |
| 5,337,398 A | * | 8/1994 | Benzoni et al. | 385/90 |
| 5,500,540 A | * | 3/1996 | Jewell et al. | 257/82 |

(List continued on next page.)

FOREIGN PATENT DOCUMENTS

| | | |
|---|---|---|
| JP | 405190528 A | 7/1993 |

OTHER PUBLICATIONS

Krishnamoorthy, Ashok V., Firehose Architectures for Free–Space Optically–Interconnected VLSI Circuits, Special Issue on Parallel Computing with Optical Interconnect, Journal of Parallel and Distributed Computing, Nov. 1996, pp. 1–10 complete article also see marked up cover and p. 6 included.

Travers, Christine M. et al., VLSI Photonic Smart Pixel Array for I/O System Architectures, pub Jan. 1998, This is best copy found.

Kitayama, Ken–Ichi et al, Two Dimensional Parallel Optical Data Link: Experiment* IEEE, 1996 pp. 206–214.

Neff, John A. et al. VCSEL/CMOS Smart Pixel Arrays for Free Space Optical Interconnects, IEEE 1996 pp. 282–289.

Kosaka, Hideo et al., Plastic–Based Receptacle–Type VCSEL–Array Modules with One and Two Dimensions Fabricated Using the Self Allignment Mounting Technique, IEEE 1987 or 1997 pp. 382–385 This is best copy found.

No Author, ——Smart Pixel Array (SPA) for VLSI–Photonics, DARPA website, this is the best copy found.

*Primary Examiner*—Robert H. Kim
*Assistant Examiner*—Thomas R Artman
(74) *Attorney, Agent, or Firm*—Maine & Asmus (57) ABSTRACT

An optical array chip (60) is flip-chip bonded to ASIC substrate (50), and electrically connected to its supporting circuitry through compressively joined solder bump sets (57) and (67). Flowable epoxy hardener material (70) is applied to underfill between the surfaces of chip (60) and the ASIC surface, surrounding the bump contact sets and filling a standoff cavity system that had been etched in the electrical interface side of chip (60) to a depth greater than electrical layer (66) of chip (60) by the amount of the pre-determined standoff height, prior to application of its bump contacts. Standoff grid (72) and individual optical devices (69) are exposed after lapping and etching of the optical interface side of chip (60) down to the level of electrical layer (66). The grid structure may have other forms, such as a vertical perimeter standoff ridge surrounding chip (60) or penetrating electrical layer (66), or a distributed pattern of vertical posts or wall sections penetrating electrical layer (66).

12 Claims, 5 Drawing Sheets

U.S. PATENT DOCUMENTS

| | | |
|---|---|---|
| 5,631,988 A | 5/1997 | Swirhun et al. |
| 5,692,083 A * | 11/1997 | Bennett ........................ 385/88 |
| 5,858,814 A | 1/1999 | Goossen et al. |
| 5,858,841 A | 1/1999 | Hsu |
| 5,912,913 A | 6/1999 | Kondow et al. |
| 5,978,401 A | 11/1999 | Morgan |
| 6,002,180 A | 12/1999 | Akram et al. |
| 6,421,474 B2 * | 7/2002 | Jewell et al. ................. 385/14 |

* cited by examiner

PRECISION GRID STANDOFF FOR OPTICAL COMPONENTS ON OPTO-ELECTRONIC DEVICES

CROSS REFERENCE TO RELATED APPLICATIONS

This application relates and claims priority for all purposes to pending U.S. application No. 60/199,099, filed Apr. 21, 2001, by at least one of the same inventors.

BACKGROUND OF THE INVENTION

1. Technical Field of the Invention

This invention most generally relates to spacing and support of planar components of optical communications systems, and more particularly to a method of providing uniform spacing and support between planar optical components of an opto/electronic device.

2. Background Art

Integrated circuit technology allows large numbers of VCSEL (Vertical Cavity Surface Emitting Laser) laser emitters/transmitters and p-i-n diode photo detectors/receivers to be integrated into large, two dimensional planar arrays, with one or more such arrays mounted on a common ASIC (Application Specific Integrated Circuit) substrate, as by flip-chip methods, also known as hybridization mounting techniques, each emitter and detector of the array making electrical connections with circuitry previously constructed in the ASIC substrate. This compound device, when coupled to a terminal end or node of an optical link such as the end of a fiber optic bundle, provides an electro/optical communications interface where the optical transmission path is configurable independent of the location and orientation of the emitter array or sub-array as compared to the respective detector array or sub-array, as with a multi-channel fiber optic bundle. This capability enables uni-directional or bi-directional optical communications between a local processor section on or electrically connected to the host ASIC substrate and other optical processors or similarly equipped electronic processors on the host ASIC device, or between the local processor section and other optical or electronic processors on other associated or remote ASIC substrates or devices.

As the density of the arrays of emitters and detectors increases, coupling a multi-channel fiber optic cable, image guide, or other optical connector or terminating device to the transceiver array becomes an increasingly arduous task. In addition to the two dimensional considerations of aligning the terminating device with the array, i.e., X, Y and θ (rotational) alignment, so as to align the independent path optical channels with appropriate emitters and detectors, there is the two-edged coupling problem of establishing the minimum practical spacing between the optical units and the optical link terminator for most efficient light transfer, and making it parallel, i.e., Z, pitch and roll (tip and tilt), while protecting the emitters and detectors from contact or contamination.

The problems posed above might be addressed by a suitable large array, fiber optic connector, image guide, or similar optical link connector/terminator or multi-connector scheme, where the connector has a planar attribute to its coupling face for uniformly close coupling alignment with the optical transmitter or receiver array. Such connectors and other connector problems and capabilities or at least aspects of them may be novel and may be the subject of other pending patent applications, but are not the subject of the present invention and the claims thereto. It is the spacing and support issues inherent in any scheme for connecting a photo array connector to the planar face or faceplate of an optical channel connection that is addressed herein.

SUMMARY OF THE INVENTION

It is an object of the invention to provide a method, and the resulting product or apparatus, for making a precision standoff and spacing structure in an opto-electronic interface apparatus, that rises above the optical face of a planar array of photo emitters and/or detectors. The standoff structure provides for proper parallel alignment and minimal interplanar spacing the attachment of a multi-channel optical link terminator or connector component to the face of the photo array or focal plane array, while providing good physical protection for the optical devices in the array.

It is a further object to provide for a standoff support structure that is fabricated about the optical array at the time the array is flip-chip bonded to an IC (integrated circuit) substrate. It is a yet further object to combine the bonding process material and step into the fabrication of the standoff structure.

It is another object of the invention to provide a standoff ridge around the perimeter of a planar optical array, or an internally distributed grid or other vertical wall pattern of standoff structure that will extend or enhance the functionality of the standoff structure.

It is an additional object of the invention to provide for the isolation of each optical device within the apparatus, or of select groupings of optical devices, by means of a standoff wall pattern of non-conductive material that extends through the opto-electronic layer of the apparatus and up to standoff height.

Still other objects and advantages of the present invention will become readily apparent to those skilled in this art from the following detailed description, which shows and describes embodiments of the invention, and illustrates the best mode for carrying out the invention. As will be realized, the invention is capable of other and different embodiments, and its several details are capable of modifications in various obvious respects, all without departing from the invention.

DESCRIPTION OF THE PREFERRED EMBODIMENT

There are herein described and illustrated preferred embodiments of the invention which will be readily understood by those skilled in the art. Other various embodiments and equivalent variations, all within the scope of the claims which follow, will be apparent to those skilled in the art.

Figure 1:
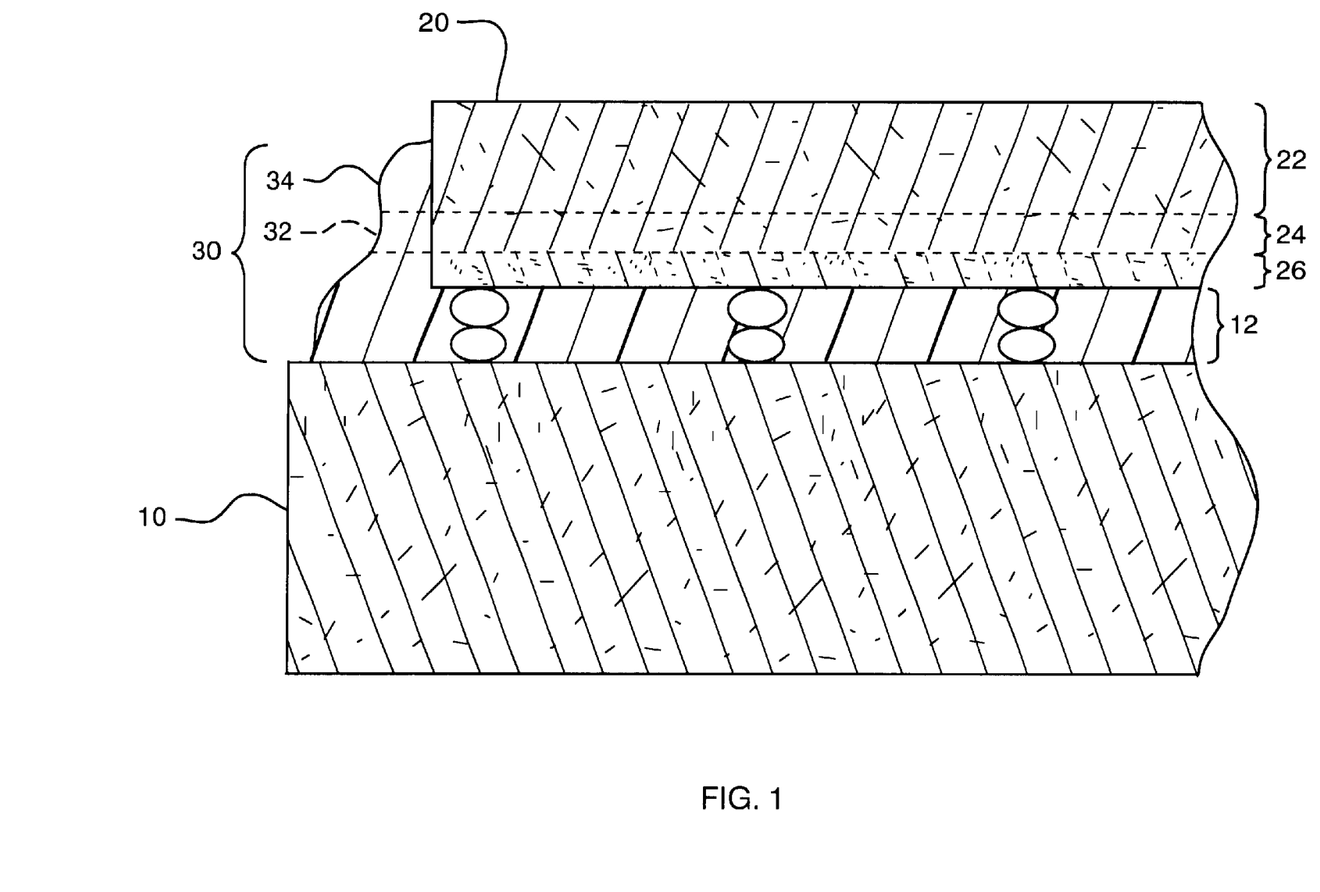
FIG. 1 is a partial cross section view of a partially completed product by a first preferred embodiment method, illustrating a transceiver array flip-chip bonded to an ASIC substrate, where a flowable, electrically insulative bonding agent has been applied to the sidewalls of the transceiver and allowed to wick in between the optical array and the ASIC substrate.
Figure 2:
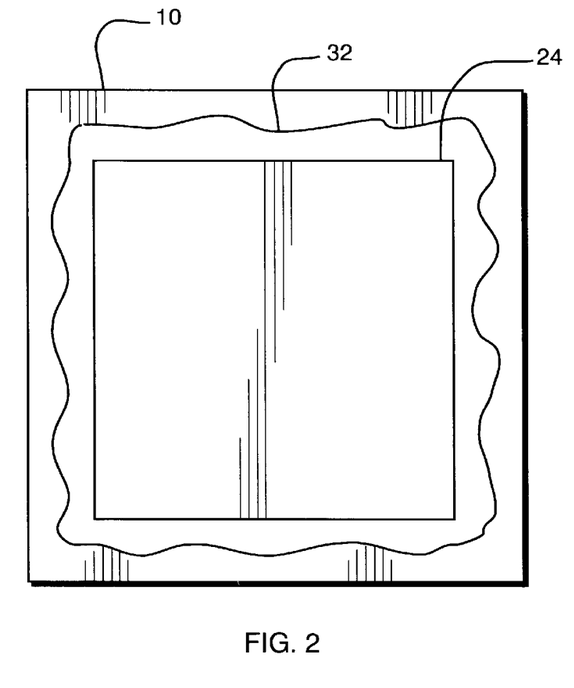
FIG. 2 is a planar view of the ASIC substrate of FIG. 1 after a lapping operation has reduced the height of the epoxy perimeter sidewall and the optical device substrate to a predetermined standoff height and minimum width.
Figure 3:
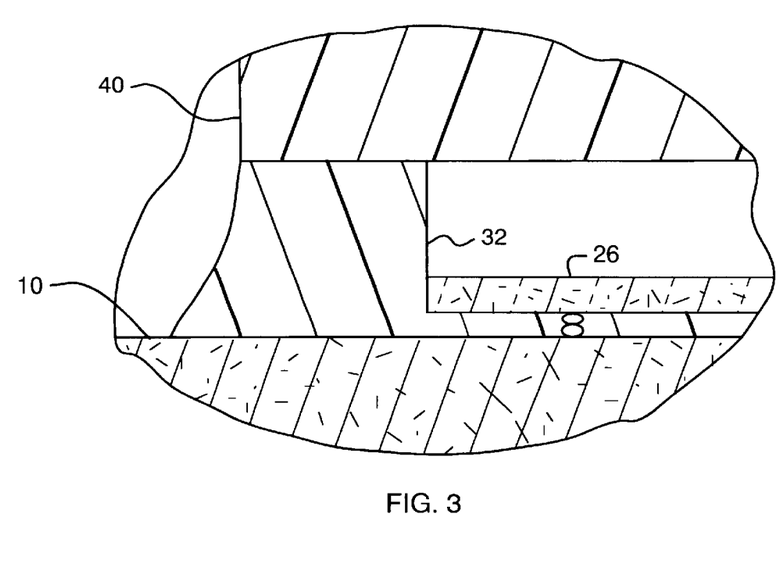
FIG. 3 is a partial cross section of the product of FIG. 2, after etching of the optical array to expose the optical face of the electrically active layer of the optical device, and application of a connector faceplate against the epoxy perimeter standoff ridge.

Referring to FIGS. 1, 2, and 3, (not to scale) consistent with the summary description, there is illustrated a product of a first preferred embodiment method of the invention for incorporating an epoxy perimeter standoff and component spacing ridge structure 32 around the perimeter of the optical array chip 20 of VCSEL's and/or p-i-n photodiodes. The epoxy perimeter standoff structure 32 provides predetermined spacing of about 40 microns and support for the attachment of planar faced, multi-channel optical link terminator or connector faceplate 40 to the optical face of photo array 20 spacing while providing physical protection of the optical devices in the array.

The methodology of the embodiment is apparent in the figures. Fully fabricated optical array chip 20 is first flip-chip mounted to ASIC substrate 10 at respective solder bumps as is the current practice, providing electro-mechanical connections from the substrate electronic circuitry to the photo devices of the optical array with a spacing between the ASIC and the array chip of about five microns. A bead 30 of a hardening, flowable, electrically non-conductive bonding agent, such as a two part epoxy-based material, is then applied around the perimeter of transceiver array chip 20 so as to allow wicking of the hardening material between substrate 10 and array chip 20 for a full surface contact bonding action when the bonding agent is cured. The deposit of epoxy bead 30 is extended up the sidewall of chip 20 as illustrated in FIG. 1, and allowed to cure, providing optical connector surface area support as well as mechanical bonding of chip 20 to substrate 10 around the distributed electrical solder bump connections.

Referring in particular to FIG. 1, layers 22 and 24 of array chip 20 consist of the Gallium Arsenide substrate upon which electrically active layer 26 was constructed. While the layer 26 may be only about five microns thick, the total thickness of chip 20 before lapping may typically be 600 microns or more.

Referring in particular to FIG. 2, subsequent to the flip-chip and hardening application operations, in a lapping operation known in the art, section 34 of cured epoxy bead 30 is removed along with layer 22 of the array chip. The lapping operation is calculated to leave an epoxy ridge 32 of about 40 microns height for standoff spacing, and at least about 50 microns wide for structural integrity, as well as about a 40 micron layer 24 of chip 20 substrate for further processing by other means. Lapping operations as practiced by the applicant have about a plus or minus 10 micron variance, so the targeted 40 micron standoff height may vary between 30 and 50 microns. This range of spacing is sufficient for many devices with proper two-axis lateral alignment, to accommodate the divergent light paths between the optical devices of chip 20 and connector optical surface or faceplate 40.

Referring in particular to FIG. 3, conventional etching steps, to which the cured hardening agent 30 is impervious, are conducted to remove remaining substrate layer 24 of chip 20, exposing photo-electrical layer 26, which in this embodiment is about five microns thick. This leaves the full perimeter standoff ridge 32 with a top plane at the intended 30 to 50 micron distance from the top surface of electrical layer 26. The planar surface of an optical connector or faceplate 40 is then placed on or near the standoff ridge 32 for spacing, then aligned and attached to the chip assembly by any suitable means, (not here illustrated), standoff ridge 32 having thus fulfilled its functions. Any suitable means of attachment of a connector or connector faceplate or other first component of the optical link termination to the ASIC/transceiver array assembly that does not interfere with the required optical pathways between the emitters and detectors of optical array chip 20 and the respective optical channels of connector 40, is within the scope of the invention.

Referring now to FIGS. 4–7, (not to scale) in a second preferred embodiment, an optical device array 60 such as a VCSEL and or p-i-n photodiode array is constructed on a substrate layer such as of Gallium Arsenide, about 600 microns thick. Other substrate materials and thickness are equally applicable. Opto-electric layer 66, is deposited to a very uniform depth which may be five to seven microns for this embodiment, depending on the particulars of the design, and will be concluded with solder bump contacts 67 or the like for mounting and electrical connections to ASIC substrate 50 by flip-chip techniques.

Figure 4:
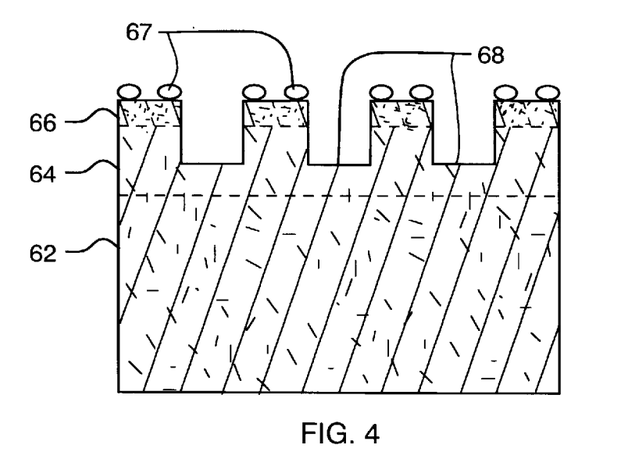
FIG. 4 is a partial cross section illustration of a product in process, an optical array in which, in accordance with a second preferred embodiment of the invention, a standoff cavity system has been etched between optical devices of the array to a depth greater than the optical face of the electrically active layer, and bump contacts have been a applied.

Referring particularly to FIG. 4, after completion of the electrical layer 66, but prior to application of the solder bumps 67, a grid or other suitable etch-mask pattern is applied to electrical layer 66 so as to divide the optical devices, or otherwise divide into subgroups the planned electrical connections and functionality of the several optical devices in the array, with an etched trench cavity system 68 that will later be an internal grid and protruding standoff structure. The etch-mask pattern may be designed to electrically isolate the respective optical devices or groups of devices with a uniform grid structure of intersecting walls, or to otherwise establish a distributed pattern of standoff structures, including walls, pillars and posts, between the optical devices or groups of devices, across what will be the optical face of chip 20 after the lapping and etching of the reverse side. The alternative distributed standoff structures may be useful in cases where the electrical isolation is not required or wanted.

Figure 6:
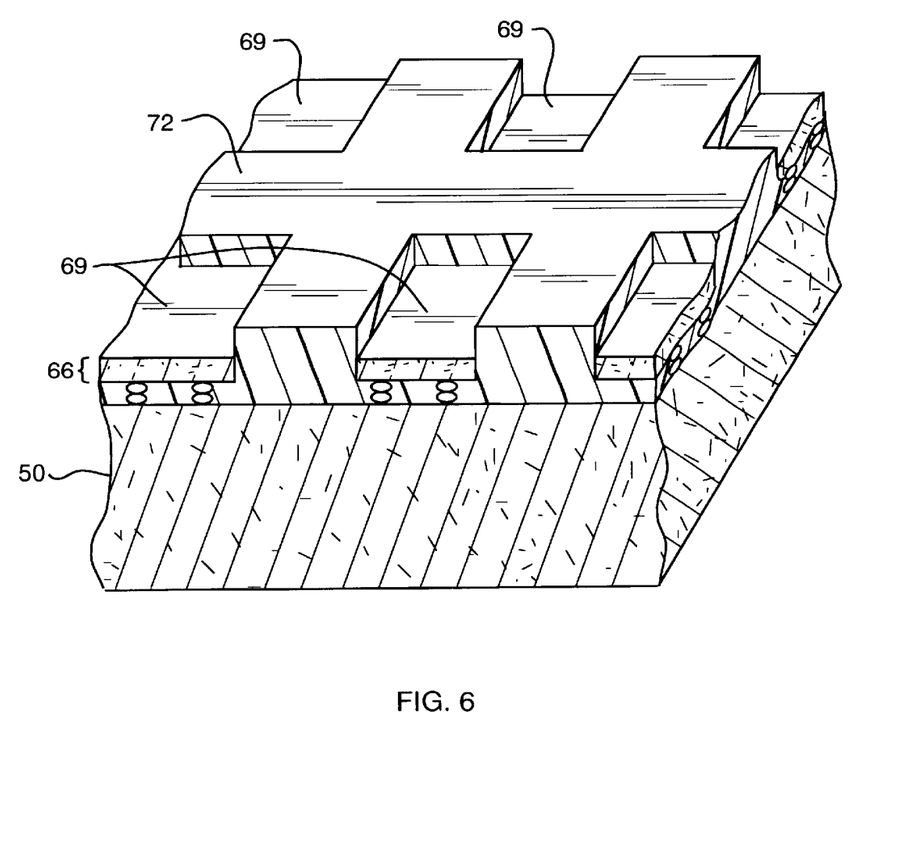
FIG. 6 is a partial perspective view of the completed product in process of FIG. 5, illustrating the cured epoxy standoff grid and segregated sections of the electrical layer of FIG. 4, each being an individual electro-optical component with respective bump connections to the ASIC substrate.
Figure 7:
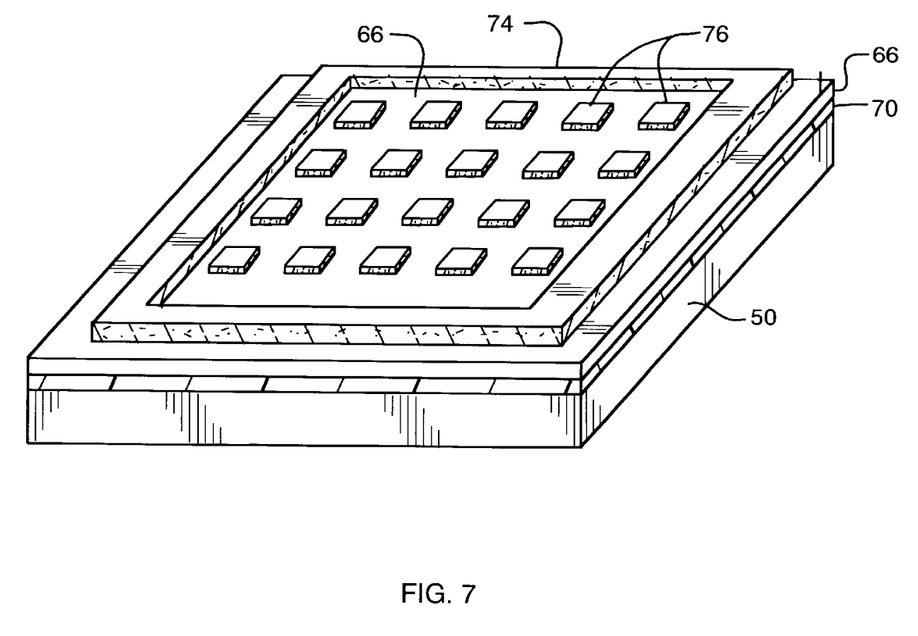
FIG. 7 is a perspective view of a variant of the product of FIG. 6, illustrating a perimeter ridge and distributed post standoff pattern within the surface area of the optical array.

The standoff structure mask pattern, whether a uniform grid as illustrated in FIG. 6, or other distributed arrangement of standoff structures such as pedestals or posts as in FIG. 7, is then etched to a precision depth that can be selected to be as little as five microns deeper than the optical surface of electrical layer 66, this being a practical minimum for a distributed standoff structure for assuring non-contact with a connector faceplate. Etch depth accuracy to within plus or minus one or two microns is achievable, so a calculated standoff depth of 10 microns more than the thickness of the optical face of electrical layer 66, with a distributed internal standoff structure or grid pattern, provides very adequate assurance for non-contact while maintaining a minimum interplanar spacing as is desired between the optical devices of the transceiver array chip 60 and the optical channel terminations of a connector or faceplate.

Subsequent etching of the mask pattern of array chip 60 produces standoff trench or cavity system 68 at the selected precision depth as described above. The typical pitch of the optical elements in this embodiment being about 125 microns, there is room for internal standoff structures between optical elements of widths up to 75 or even 100 microns, although about 10 microns is sufficient for structural integrity. Solder bumps are then applied, providing the necessary electrical connections of each optical device.

Figure 5:
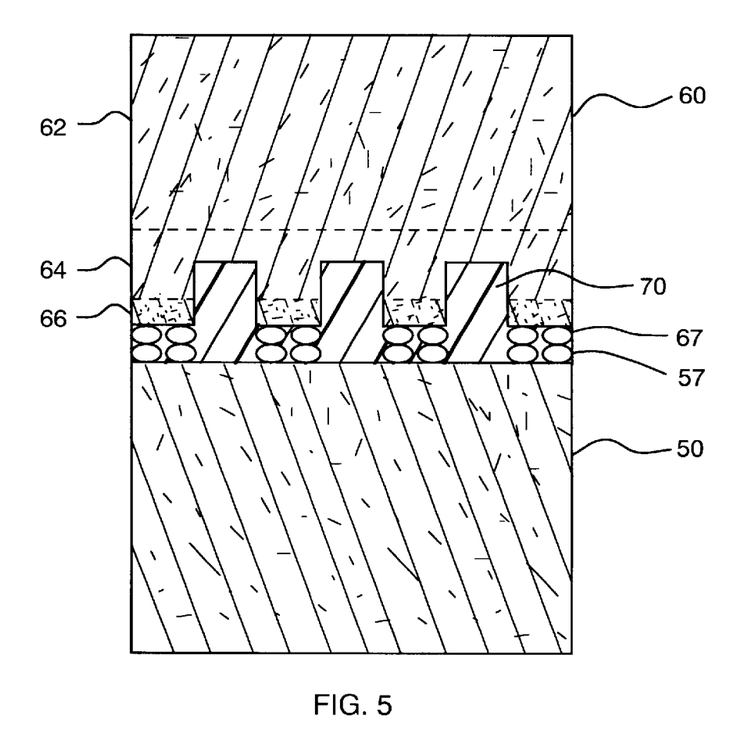
FIG. 5 is a partial cross section illustration of the product in process of FIG. 4, the optical array flip-chip mounted to an ASIC substrate in preparation for application of a flowing epoxy or other hardener which will wick between the two chips and into the now inverted standoff cavity system and then be allowed to cure.

Referring to FIGS. 5 and 6, grid standoff configured array chip 60 is then flip-chip bonded to ASIC substrate 50, and electrically connected to its supporting circuitry through each set of compressively joined solder bumps 67 and 57. Flowable epoxy hardener material 70 is then sparingly applied so that it acts to underfill between the surfaces of the transceiver array chip and the ASIC surface, surrounding the bump contact sets 57/67 and filling the standoff cavity system 68. Either before or after curing of epoxy, all of the residual material may be removed from the surfaces to prevent it from causing an errant standoff.

FIG. 6 is a perspective cutaway cross section view of a small area of the completed product by process of the second preferred method embodiment, with the standoff grid 72 exposed after lapping and etching of the Gallium Arsenide layers 62 and 64 down to the optical surface of electrical layer 66. As is clearly evident in FIG. 6, for a grid pattern that isolates each of the optical devices of array chip 60, for example, when it is etched deeper than electrical layer 66 itself, it results in the literal dissection of the array of electrical layer 66 into individual, free-standing electro-optical devices 69, each fully isolated from the other and electrically connected only to the ASIC substrate 50 through respective bump contact sets 57/67. Standoff grid 72 stands five microns taller than electrical layer 66, available to support the planar surface of a connector or a faceplate for a connector (not shown) for the transceiver's optical link.

Referring to FIG. 7, there is further illustrated a perimeter ridge 74 and distributed post 76 standoff pattern, created by the second preferred method described above, also providing the optimally small planar spacing and non-contact protection of the grid of FIG. 6.

To those skilled in the art, the invention admits of many variations. For example, there is within the scope of the invention, an optical connector standoff system for a planar array semiconductor chip of electro optical devices where the chip has one optical interface side and one electrical interface side, consisting of an integrated circuit substrate with contact points on a top surface for connecting to the electro optical devices, and the planar array chip is configured proximate and parallel to the top surface of the integrated circuit substrate, with the electro optical devices being electrically connected at the contact points to the integrated circuit substrate. There is an integral bonding layer and perimeter standoff ridge, where the bonding layer extends between the planar array chip and the top surface, with the perimeter standoff ridge extending around the perimeter of the array chip and rises to a predetermined standoff distance above the optical surface of the electro optical devices.

The electro optical devices may be VCSELs, photodiodes or other electro-optical semiconductor devices. The flowable bonding agent may be an epoxy based material. The integrated circuit substrate may support, connect to, or be part of a further optical device or a mechanical device; the primary functions in this case being to provide electrical connections for the operation of the opto-electronic devices, as well as the electrical portion of the communications channel pathway or pathways of this opto-electronic interface apparatus.

As another example of the invention, there is a method for making an optical connector standoff system for a planar array semiconductor chip of electro optical devices where the chip again has one optical interface side and one electrical interface side, including the steps of: using an integrated circuit substrate with contact points on a top surface for the electro optical devices, configuring the planar array chip proximate and parallel to the top surface of the integrated circuit substrate with the electrical interface side adjacent the top surface, electrically bonding the electro optical devices at their contact points with the respective contact points of the integrated circuit substrate, applying a flowable bonding agent to the top surface and around the sidewall of the chip for wicking of the bonding agent between the chip and the top surface, building up of a perimeter wall of bonding agent around the sidewalls of the chip to at least a predetermined final standoff height with respect to the height of the optical surface level within the chip, curing the flowable bonding agent so as to bond the chip to the integrated circuit substrate and harden said perimeter wall, then lapping the optical interface side of the chip and the perimeter wall around it to the predetermined final standoff height, and finally etching the optical interface side of the chip within and between the perimeter walls of cured bonding agent down to the optical surface level therein.

As yet another example of the invention, there is an optical connector standoff system for a planar array semiconductor chip of electro optical devices where the chip has one optical interface side and one electrical interface side, consisting of an integrated circuit substrate with contact points on a top surface for said electro optical devices, with the planar array chip having a standoff cavity system let into the electrical interface side by mask and etching or any other technique for controlled removal of material in precise patterns to precise depths. The cavity system must be deeper than the optical surface level within the chip by at least a predetermined standoff height. The planar array chip is configured proximate and parallel the top surface of the IC (integrated circuit) substrate, with its electrical interface side adjacent the top surface, and the electro optical devices electrically connected at the contact point sets with the integrated circuit substrate. There is an integral bonding layer and standoff structure, where the bonding layer extends between the planar array chip and the top surface of the IC substrate, and the standoff structure occupies the standoff cavity system and rises to the predetermined standoff distance above the exposed optical surface level of the opto-electrically active layer of the chip.

The standoff structure may be a grid of intersecting walls, there being within each rectangle of the grid one electro optical device of the array chip. The standoff structure may be a distributed pattern of posts or pedestals or pillars or partial walls within the optical surface area of the chip, in devices or places where total isolation of each device is not needed. The standoff structure may also be or have a similarly produced perimeter ridge around the optical surface area of chip, rather than the sidewall ridge standoff of the first embodiment method. And as in prior embodiments, the electro optical devices may be VCSELs, other photo-emitters, and/or photodetectors of any type.

There is still another embodiment, a method for making an optical connector standoff system for a planar array semiconductor chip of electro optical devices where the chip has one optical interface side and one electrical interface side, including the steps of using an integrated circuit substrate with contact points on a top surface for electrical connections to the electro optical devices, evacuating a standoff cavity system in the electrical interface side of the planar array chip to a depth greater than the optical surface level within the chip by a predetermined standoff height, configuring the planar array chip proximate and parallel to the top surface of the IC substrate, with the electrical interface side adjacent to the top surface, and electrically connecting the electro optical devices through their respective contact point sets with the integrated circuit substrate. Then applying a flowable bonding agent such as a two-part epoxy bonding agent that is electrically insulative, to the top surface around the sidewall of the chip for wicking of the bonding agent between the chip and the top surface, and very importantly, into the standoff cavity system. Then curing the flowable bonding agent between the top surface and the chip so as to bond the chip to the IC substrate, and further curing the bonding agent within the standoff cavity system so as to form a conforming standoff structure. This is followed by etching the optical interface side of the chip deep enough to expose the optical surface level within the chip, thereby also exposing the standoff structure to the predetermined standoff height.

The objects and advantages of the invention may be further realized and attained by means of the instrumentalities and combinations particularly pointed out in the appended claims. Accordingly, the drawing and description are to be regarded as illustrative in nature, and not as restrictive.

We claim:

1. An optical connector standoff system for a planar array semiconductor chip of electro optical devices where said chip has one optical interface side and one electrical interface side, comprising
    an integrated circuit substrate with contact points on a top surface for said electro optical devices,
    said planar array chip configured proximate and parallel said top surface, said electro optical devices being electrically connected at said contact points with said integrated circuit substrate,
    an integral bonding layer and standoff structure, said bonding layer extending between said planar array chip and said top surface, said standoff structure extending around at least a portion of the perimeter of said array chip and into a cavity system formed between optical devices of the array chip, said standoff structure rising to a predetermined standoff distance above the optical surface of said electro optical devices.

2. An optical connector standoff system for a planar array semiconductor chip of electro optical devices according to claim 1, said electro optical devices comprising VCSELs.

3. An optical connector standoff system for a planar array semiconductor chip of electro optical devices according to claim 1, said electro optical devices comprising photodiodes.

4. An optical connector standoff system for a planar array semiconductor chip of electro optical devices according to claim 1, wherein said standoff structure is a bonding agent that is flowed into said cavity system.

5. An optical connector standoff system for a planar array semiconductor chip of electro optical devices where said chip has one optical interface side and one electrical interface side, comprising
    an integrated circuit substrate with contact points on a top surface for said electro optical devices,
    said planar array chip having a standoff cavity system let into said electrical interface side, said cavity system being deeper than the optical surface level within said chip by at least a predetermined standoff height,
    said planar array chip configured proximate and parallel said top surface with said electrical interface side adjacent said top surface, said electro optical devices being electrically connected at said contact points with said integrated circuit substrate,
    an integral bonding layer and standoff structure, said bonding layer extending between said planar array chip and said top surface, said standoff structure occupying said standoff cavity system and rising to said predetermined standoff distance above said optical surface level.

6. An optical connector standoff system for a planar array semiconductor chip of electro optical devices according to claim 5, said standoff structure being a grid within each rectangle of which is a said electro optical device.

7. An optical connector standoff system for a planar array semiconductor chip of electro optical devices according to claim 5, said standoff structure comprising a distributed pattern of posts within the optical surface area of said chip.

8. An optical connector standoff system for a planar array semiconductor chip of electro optical devices according to claim 5, said standoff structure comprising a perimeter ridge around said optical surface area of said chip.

9. An optical connector standoff system for a planar array semiconductor chip of electro optical devices according to claim 5, said electro optical devices comprising VCSELs.

10. An optical connector standoff system for a planar array semiconductor chip of electro optical devices according to claim 5, said electro optical devices comprising photodiodes.

11. An optical connector standoff system for a planar array semiconductor chip of electro optical devices where the chip has an optical interface side with an optical surface level, and an electrical interface side, comprising:
    a substrate having contact points on a surface, and adapted for electrically interfacing with the electrical interface side of the chip;
    a standoff cavity system let into the electrical interface side of the chip, the cavity system being deeper than the optical surface level of the chip by at least a predetermined standoff height;
    a standoff structure occupying the standoff cavity system and adapted for mechanically interfacing the electrical interface side of the chip with the surface of the substrate, the standoff structure rising to the predetermined standoff distance above the optical surface level.

12. An optical connector standoff system for a planar array semiconductor chip of electro optical devices according to claim 11, wherein said standoff structure is a bonding agent that is flowed into said cavity system.

* * * * *